United States Patent
Carlisle

(10) Patent No.: US 6,201,232 B1
(45) Date of Patent: Mar. 13, 2001

(54) IMAGING SYSTEM WITH A TWO-AXIS-GIMBAL MIRROR SCAN SYSTEM APPARATUS AND METHOD

(75) Inventor: Guy W. Carlisle, Bedford, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/198,698

(22) Filed: Nov. 24, 1998

(51) Int. Cl.$^7$ .............................. G02B 26/10; G01C 21/02
(52) U.S. Cl. ........................ 250/206.2; 250/236; 359/212
(58) Field of Search .............................. 250/206.1, 206.2, 250/206.3, 203.1, 234, 235, 236, 334, 347; 359/197, 198, 212, 213, 214, 221, 554, 555

(56) References Cited

U.S. PATENT DOCUMENTS 5,663,825 * 9/1997 Amon et al. ........................ 250/236

* cited by examiner

Primary Examiner—John R. Lee
Assistant Examiner—Kevin Pyo
(74) Attorney, Agent, or Firm—Samuels, Gauthier & Stevens LLP

(57) ABSTRACT

A mirror is scanned to provide an image of a portion of the Earth to a multiband focal plane array (MBFPA) of optical detectors (an "imager"). Initially, the mirror is positioned relative to a first axis. The mirror is then scanned about a second axis and repositioned relative to the first axis while scanning the mirror about the second axis. This invention may be used in a weather satellite to remove prevent/reduce errors in pixel-to-pixel registration within an image frame and errors in band-to-band that occur when the various imaging bands (e.g., visual and infrared) of the MBFPA are used to image or scan selected areas of the Earth. The present invention positions the mirror relative to the first axis (e.g., elevation), and while scanning the mirror about the second axis (e.g., azimuth), the mirror is regularly repositioned in a prescribed manner relative to the first axis. That is, the invention dynamically adjusts the position of the mirror relative to the first axis while scanning about the second axis. Scanning about the first axis may be an elevation scan while scanning about the second axis may be an azimuth scan, or vis-a-versa. Advantageously, this control technique ensures that the images within each spectral band are spatially registered pixel-by-pixel within the image frame, and that the images of the various spectral bands are spatially coregistered with respect to each other. The present invention provides a scan-control technique for a single-mirror scan system that enables the use of the MBFPA in an imaging instrument.

9 Claims, 8 Drawing Sheets

IMAGING SYSTEM WITH A TWO-AXIS-GIMBAL MIRROR SCAN SYSTEM APPARATUS AND METHOD

GOVERNMENT RIGHTS

The government may have certain rights in this invention pursuant to United States Air Force Contract No. F19628-95-C-0002.

BACKGROUND OF THE INVENTION

The present invention relates to an orbital optical imaging system, and in particular to a method and apparatus that controls a scanning mirror, which provides a reflected image to a multiband (i.e., multiple spectral bands) focal plane array.

Satellites are widely used as platforms for various atmospheric monitoring instruments. For example, the United States National Oceanic and Atmospheric Administration (NOAA) operates a number of satellites that are used for weather monitoring. Some of these satellites operate in a geosynchronous orbit and regularly scan over predetermined areas of the Earth in order to monitor current weather conditions and provide data to weather forecasting systems.

The optical imaging instrument (an "imager") on these satellites includes several optical spectral bands that are used to monitor the weather. For example, there may be a visible imaging band and several infrared imaging bands. These various spectral bands together provide information regarding cloud cover and various forms of precipitation (e.g., rain, snow, sleet or hail) over the area of the Earth being monitored.

Technology improvements have recently made available large arrays comprising hundreds of optical detectors, that were not available when the current weather satellites were designed and manufactured. It is now possible to combine side-by-side, on a common surface, several long, line arrays of optical detectors, with each line array having detectors responsive to a particular spectral band. This assembly is often referred to as a multiband array of detectors. If this assembly of detectors is then installed on the focal plane of an optical instrument, the assembly is called a multiband focal plane array (MBFPA). For example, the MBFPA of a weather imager may include a visible band (e.g., 0.5–0.7 micrometers) and a number of infrared bands (e.g., eight bands over the range 1.8–13 micrometers).

An engineering obstacle to the use of a MBFPA in an advanced imager is the geometric distortion due to an optical effect known as "image rotation" that results if the MBFPA is used in combination with a conventional single-mirror scanning system. The purpose of the scanning system is to project a selected portion of the Earth (the "scene") onto the MBFPA. In a conventional, single-mirror scanning system the mirror is first positioned relative to a first axis (e.g., to select the elevation of the scan), and then scanned about a second axis (e.g., azimuth) while holding the mirror position constant with respect to the first axis. The first and second axes are orthogonal. This scan process allows a user to select the Earth scene (usually in an automated sequence of scans) to be viewed by the imaging instrument. The scanning process can be repeated in a progressive sequence to obtain a multi-spectral image of the full Earth disk.

However, the use of a conventional, single-mirror scan system in combination with the MBFPA causes two undesirable errors. The first error is a pixel-to-pixel registration error within a frame, which is a geometrical distortion in which the pixels within an image frame are misaligned with respect to each other, such that they are not "observed" at their true positions in the Earth scene. The second error is a band-to-band coregistration error. The coregistration error is a geometrical effect in which the detectors in different spectral line arrays of the MBFPA do not traverse the same area of the Earth scene during the scan. Both of these errors have an adverse effect on the quality of weather imagery. Therefore, a technique is needed to image an Earth scene onto the MBFPA without introducing the registration and coregistration errors in order to utilize the new MBFPA technology effectively. Several techniques are currently under investigation.

One technique is to use an assemblage of multiple beamsplitters to split the incoming light flux onto a series of separate, single-band focal plane arrays of detectors. However, this technique does not enable the use of the MBFPA since the separate focal planes have detectors of only a single spectral imaging band. In addition, this technique does not correct for the pixel-to-pixel registration error. This design approach is also relatively costly and complex due to the precision required in the physical alignment and calibration of the assemblage of beamsplitters.

A second approach under consideration is to use two cascaded scanning mirrors. The first mirror would scan about a first axis (e.g., scan in elevation), while the second mirror would scan about a second axis (e.g., scan in azimuth). This approach would correct both registration and coregistration errors and, indeed, enable the use of the MBFPA technology. However, since the mirror is a heavy component of the imager, adding an additional mirror is undesirable because it adds to the mass and bulk of the satellite. Significantly, it adds to the launch mass of the satellite.

Therefore, there is a need for an imaging system comprising a MBFPA that is free from the undesirable geometrical errors of image registration and coregistration.

SUMMARY OF THE INVENTION

Briefly, according to the present invention, a mirror is scanned to provide an image of a desired portion of the Earth to a multiband focal plane array (MBFPA). The mirror is first positioned relative to a first axis (e.g., elevation) as a starting position of the image scan. The mirror is then scanned about a second axis and repositioned relative to the first axis while scanning the mirror about the second axis (e.g. azimuth).

This invention may be used in a satellite-based weather imaging instrument to remove registration and coregistration errors that occur when a conventional, single-mirror scan system is used in combination with the MBFPA. The present invention positions the mirror relative to the first axis (e.g., the elevation at the start of the scan), and while scanning the mirror about the second axis (e.g., azimuth), the mirror is repositioned in a controlled manner relative to the first axis. That is, the invention dynamically adjusts the position of the mirror relative to the first axis while scanning about the second axis. Scanning about the first axis may be an elevation scan while scanning about the second axis may be an azimuth scan, or vis-a-versa.

Advantageously, this control technique ensures that the images within each spectral band are spatially registered pixel-by-pixel within the image frame, and that the images of the various spectral bands are spatially coregistered with respect to each other. The present invention provides a scan-control technique for a single-mirror scan system that enables the use of the MBFPA in an imaging instrument.

These and other objects, features and advantages of the present invention will become apparent in light of the following detailed description of preferred embodiments thereof, as illustrated in the accompanying drawings.

DETAILED DESCRIPTION OF THE INVENTION

Figure 1:
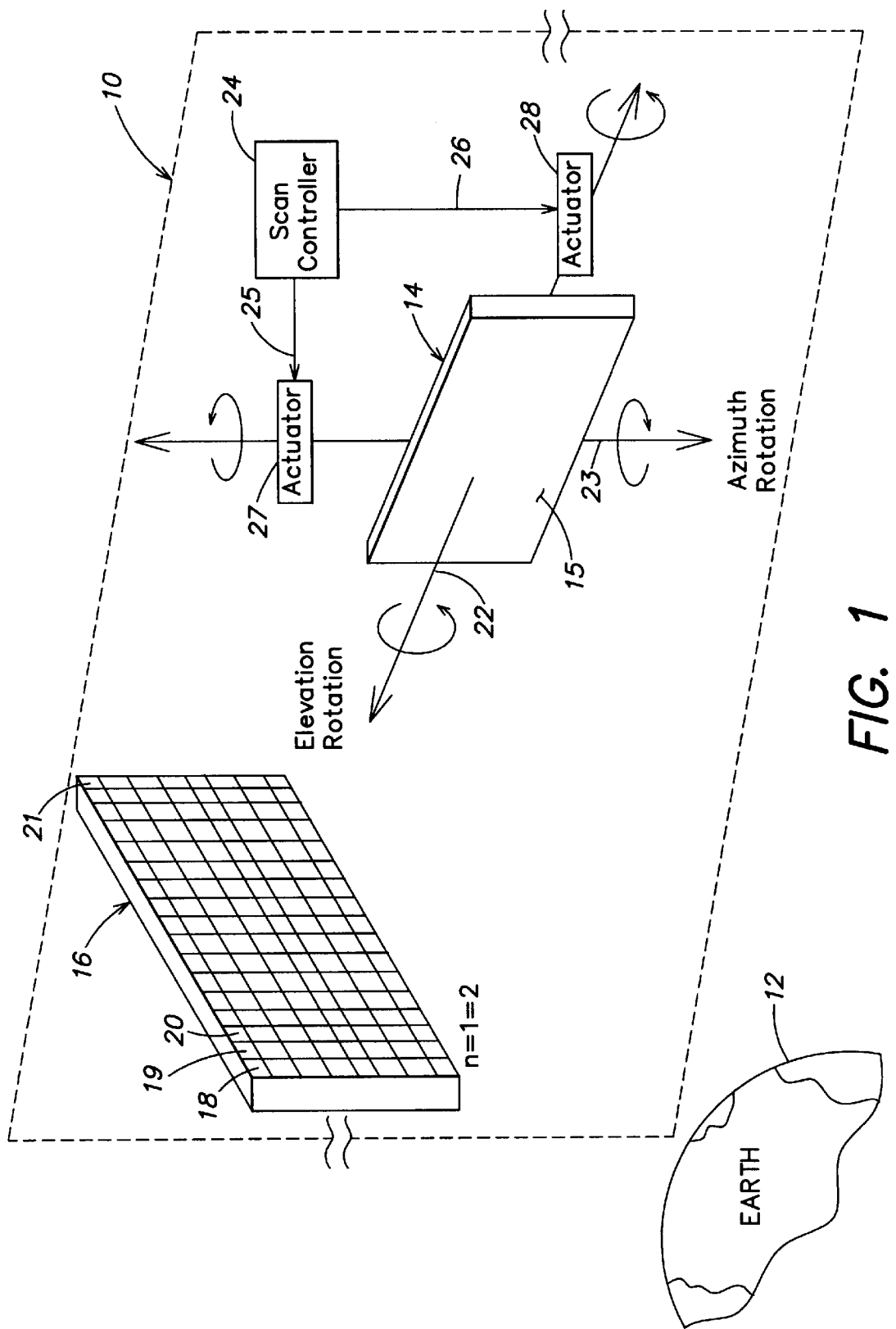
FIG. 1 is a pictorial illustration of a satellite-based imaging system positioned over the Earth.

FIG. 1 is a pictorial illustration of a satellite-based imaging system 10 positioned over the Earth 12. The imaging system 10 includes a mirror 14 having a reflective surface 15 that provides a reflected image of an area of the Earth onto a multiband focal plane array (MBFPA) 16. The MBFPA 16 includes a plurality of distinct optical imaging spectral bands 18–21 that each includes a plurality of detectors. The first band 18 may be a visible imaging band while the other bands 19–21 are infrared bands each operating at a slightly different wavelength (e.g., in the range of about 1.8–13 micrometers). The imaging system 10 may be used in a weather satellite.

The mirror 14 rotates in a limited range about a first axis 22 and limited range about a second axis 23, in order to provide a reflected image of a selected area of the Earth. Rotation about the first axis 22 scans the mirror 14 in elevation, while rotation of the mirror about the second axis 23 provides the ability to scan the mirror 14 in azimuth. The system 10 also includes a scan controller 24 that provides signals on lines 25, 26 to actuators 27, 28 that position the mirror about the first and second axes 22, 23, respectively. The system 10 may use an open or closed loop control system architecture to position and scan the mirror 14. We shall now briefly describe the optical effect known as "image rotation" that is a source of registration and coregistration errors.

Figure 2:
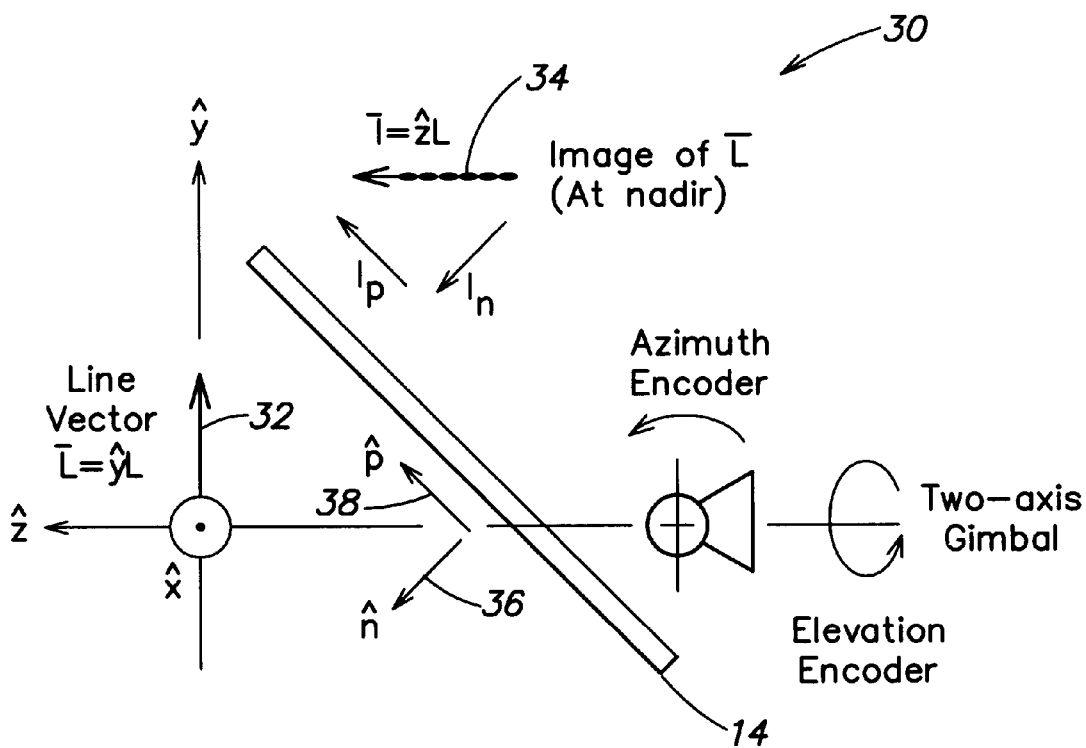
FIG. 2 is a pictorial illustration presenting the image rotation in terms of the "equivalent" rotation of a line vector.

FIG. 2 is a pictorial illustration 30 presenting the image rotation analytically modeled in terms of the "equivalent" rotation of a line vector, $\overline{L}$ 32, in the MBFPA as projected onto a flat Earth. Alternatively, one of ordinary skill will reconize that it is also possible to model the image rotation as the projection of the Earth scene on the focal plane and to extend the analysis to the geometry of a spherical Earth. For the modeling we use the method of images to replace the line vector $\overline{L}$ 32 with its image vector, $\overline{I}$ 34 (this technique is often used to solve electrostatics problems which are analytically analogous). This technique allows us to use the image vector $\overline{I}$ 34 to calculate the line vector's projection onto the Earth, as though the image vector $\overline{I}$ 34 were in free space, thus removing the complication of the mirror's presence. In the calculation, an important parameter is the mirror's normal, $\hat{n}$ 36. We can express the image vector $\overline{I}$ 34 in terms of the normal $\hat{n}$ 36 and use the normal $\hat{n}$ to keep track of the mirror's 14 orientation during the scanning process. In the scan process, the normal $\hat{n}$ 36 becomes a function of the North-South elevation, E, and the East-West azimuth, A. We shall now discuss an elevation rotation of the mirror 14 (i.e., a N-S scan).

First consider the image rotation in the case of an elevation scan (i.e., a N-S scan) in which azimuth A=0 while elevation E varies. Referring to FIG. 2, we can express the image as $\overline{I}=I_n\hat{n}+I_p\hat{p}$ where $I_n=-\hat{n}\cdot\overline{L}$ and $I_p=\hat{p}\overline{L}$. At E=0 (nadir), the normal is $$\hat{n}_0 = \frac{-\hat{y}+\hat{z}}{\sqrt{2}}.$$

For a N-S scan, through an angle E about the $\hat{z}$-axis, $$\hat{n} = \frac{-\sin E \hat{x} - \cos E \hat{y} + 1\hat{z}}{\sqrt{2}}.$$

The companion unit vector, $\hat{p}$ 38, is given by $$\hat{p} = \frac{(\hat{n}\times\overline{L})\times\hat{n}}{|(\hat{n}\times\overline{L})\times\hat{n}|}.$$

From the above relationships, after some manipulation, the image vector $\overline{I}$ can be expressed as:

$$\overline{I}=L(-\sin E \cos E \hat{x}+\sin^2 E \hat{y}+\cos E \hat{z}). \quad (EQ. 1)$$

The rotation angle of the line vector $\overline{L}$ is given by:

$$\theta = \tan^{-1}\left(\frac{\hat{x}\cdot\overline{I}}{\hat{z}\cdot\overline{I}}\right) \quad (EQ. 2)$$

Using the expression for $\overline{I}$ in EQ. 1, EQ. 2 can be rewritten as:

$$\theta=-\tan^{-1}[\sin E] \quad (EQ. 3)$$

At this point in the analysis the scan is limited to a scan in E only. At the small values E, θ≈−E, which is the case at geostationary orbit where approximately E≦8°.

The extension of the analysis to scan in both elevation E and azimuth A proceeds in a similar manner. After some mathematics, we obtain the following expression for the rotation angle θ:

$$\theta = \tan^{-1}\left[\sin E \tan\left(A-\frac{\pi}{4}\right)\right] \quad (EQ. 4)$$

Figure 3:
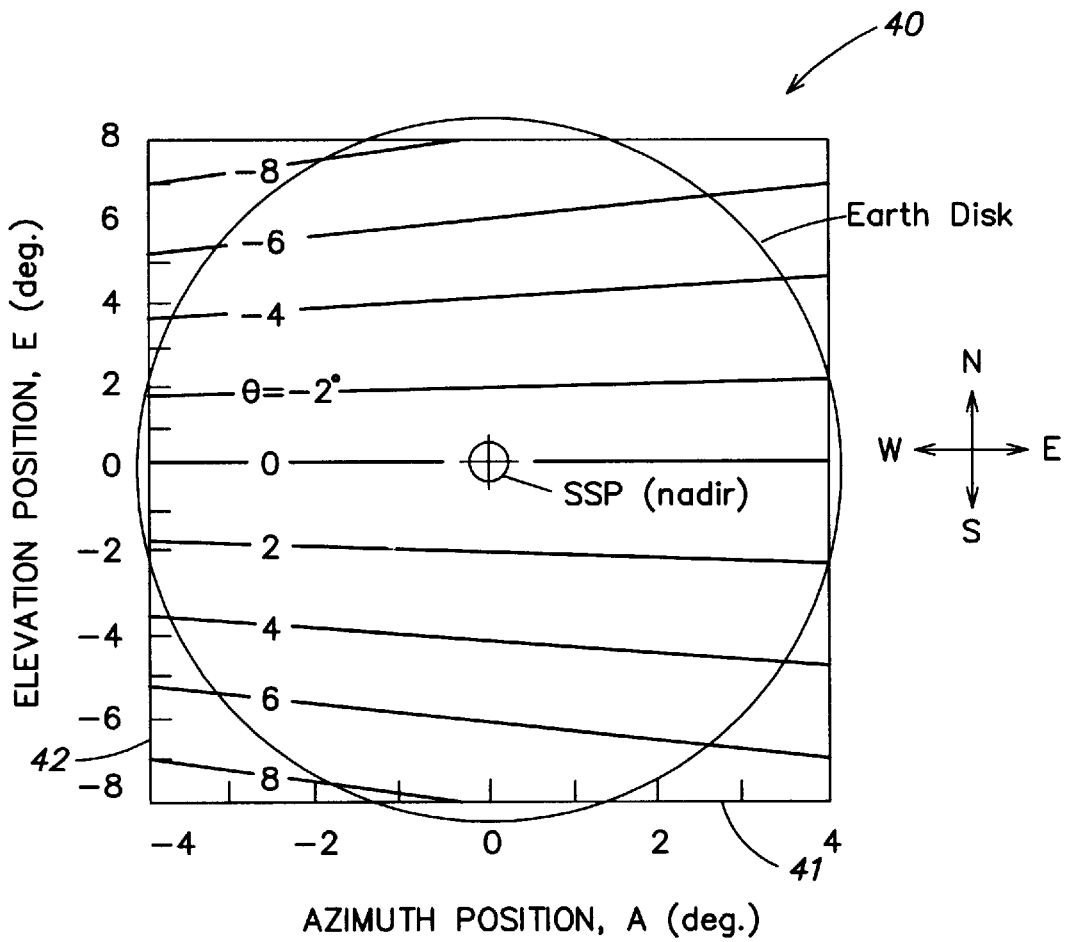
FIG. 3 illustrates a contour plot of θ as a function of azimuth angle A and elevation angle E.

FIG. 3 illustrates a contour plot 40 of θ as a function of A and E, as calculated from EQ. 4. The azimuth angle A is plotted along a horizontal axis 41 and elevation angle E is plotted along a vertical axis 42. Note that, to very close approximations, the scan mirror's azimuth encoder angle, A, is one-half of the pointing angle in the azimuth direction while the elevation encoder angle E is equal to the pointing angle in the elevation direction, such that, a range of rotation of approximately ($-4° \leq A \leq 4°$) and ($-8° \leq E \leq 8°$) provides full coverage of the Earth disk, as viewed from geostationary orbit. We now have the mathematical tools in place to calculate the registration and coregistration errors caused by image rotation.

Figure 4:
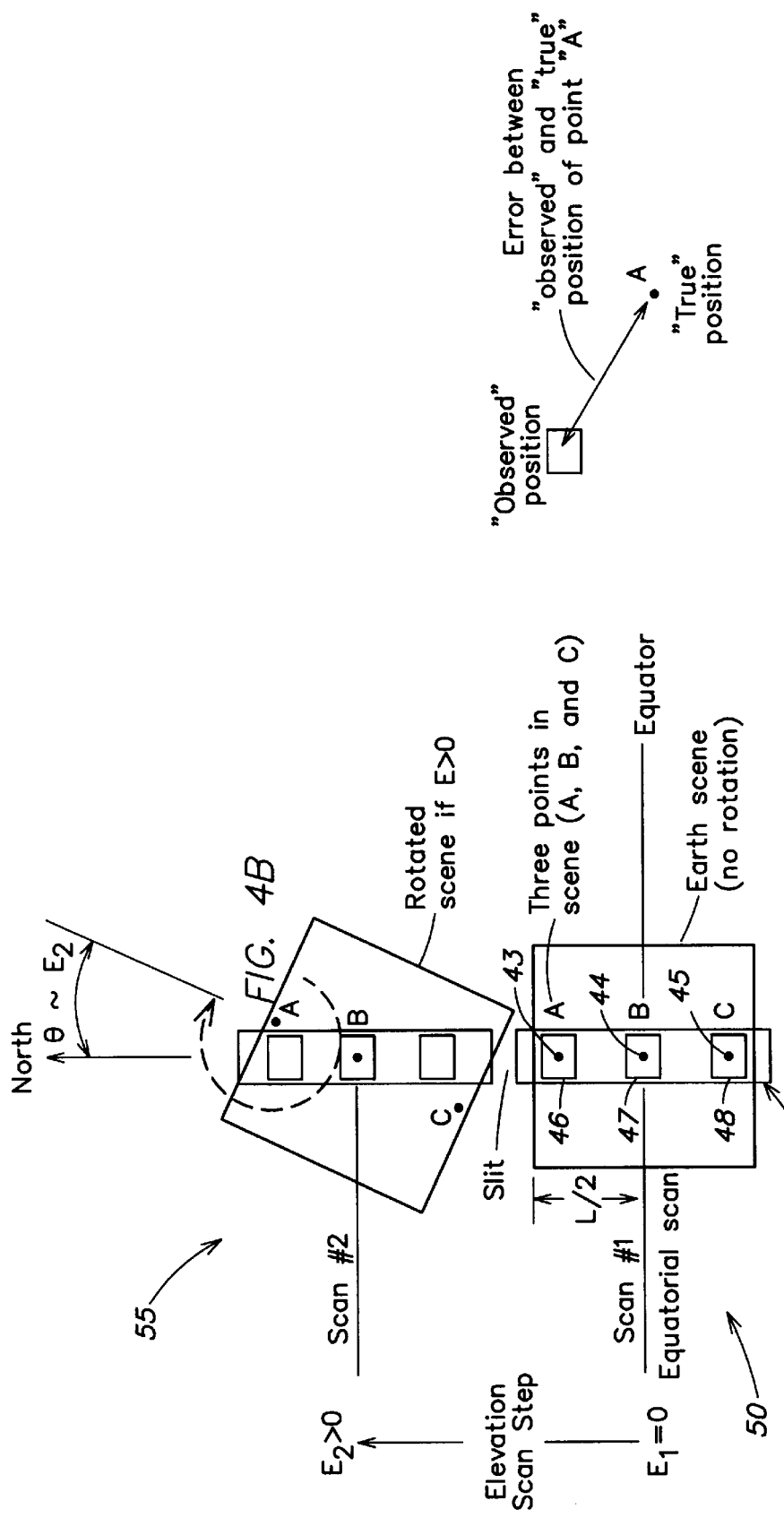
FIG. 4A illustrates the effect of "image rotation" on pixel-to-pixel registration error within a frame.
FIG. 4B is a blow-up of a regression error.

First, we calculate the registration error. FIG. 4A illustrates the effect of image rotation on pixel-to-pixel registration within an image frame. In the interest of simplicity, only three points (A,B,C) 43–45 on the Earth and three detectors 46–48 in a line array 49 (of a particular spectral band) that "correspond" to observation of these points are illustrated. The points (A,B,C) 43–45 are the "true" locations of these points in the scene, and the corresponding detectors 46–48 are the "observed" locations of the points. If the three points (A,B,C) 43–45 lay in the centers of their corresponding detectors 46–48, the pixels are registered; if not, there is a registration error.

Referring still to FIG. 4A, in scan #1 50 at the Equator ($E_1=0$), there is zero image rotation, and the points (A,B,C) 43–45 are aligned with their corresponding detectors 46–48. That is, there is no registration error because the "true" and "observed" locations of the points coalesce.

In contrast, in scan #2 55 at a location above the Equator ($E_2>0$), the image rotation displaces the location of the points (A, C) 43, 45 from their corresponding detectors 46, 48, respectively. This effect causes a registration error, as shown in the "blow-up" of FIG. 4B. The amount of registration error increases with elevation (i.e., at more northerly scans), where the image rotation increases in magnitude.

The registration error is given mathematically by:

$$\text{Error} = L/2 \sin\theta \qquad (EQ. 5)$$

In EQ. 5, the quantity L is the scan swath width, which is the projection of a N-S line array onto the Earth, and $\theta$ is the image rotation angle.

As a numerical example, assume an array length of ½", for which L=568 km. At an elevation of E=4° (i.e., an Earth scene centered at a geodetic latitude of approximately 23.6°) along the geodetic longitude that passes through the satellite's nadir point, we calculate from EQ. 5 a registration error of approximately 20 km. Extending this result (for a single swath) to a 2000-km by 2000-km image gives a registration error of approximately 40 km at E =4°, which exceeds typical requirements in weather imaging.

Figure 5:
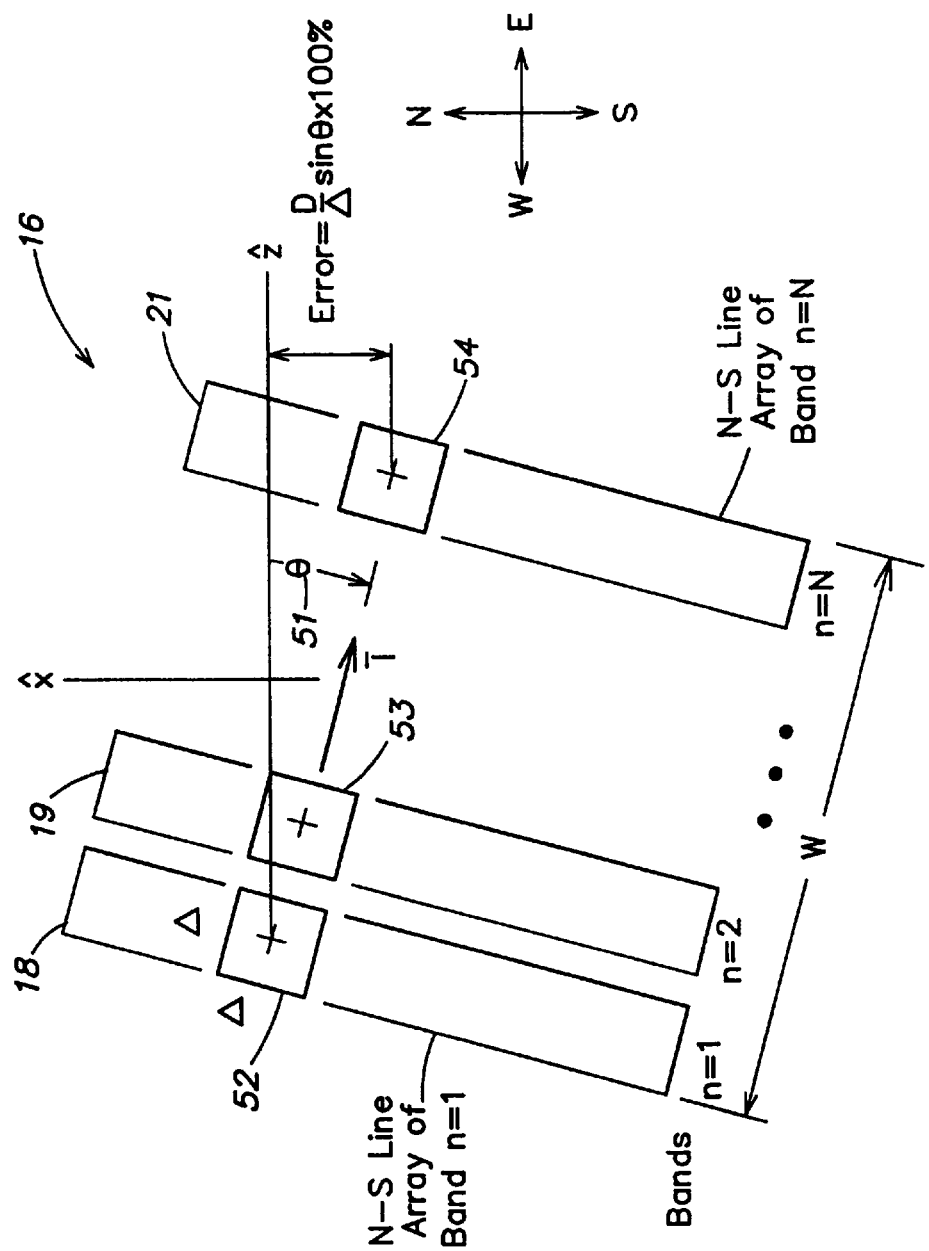
FIG. 5 illustrates the geometry of the MBFPA showing an effective "rotation" due to the scanning of the mirror (FIG. 1) that provides an image to the MBFPA.

Next, we consider the band-to-band coregistration error. FIG. 5 illustrates the geometry of the "rotation" of the MBFPA 16 due to the orientation of the scanning mirror 14 (FIG. 1), that provides an image of the Earth scene to the MBFPA. One of ordinary skill will recognize that the effective "rotation" of the MBFPA is a modeling construct of the analysis. The MBFPA does not actually rotate; rather, it is the scan mirror's reflection of the Earth scene onto the MBFPA that rotates while the MBFPA remains stationary. The line arrays of the optical imaging bands of the MBFPA 16 nominally extend in the N-S direction in the absence of image rotation, as in the azimuth scan centered on the Equator. Scanning the mirror in elevation at geodetic latitudes above the Equator causes the projection of the Earth scene on the MBFPA to rotate through angle $\theta$ 51, which can be modeled as an "effective" rotation of the MBFPA, as depicted in FIG. 5.

In FIG. 5 we see that the effective rotation of the MBPFA 16 causes a coregistration error to occur between corresponding detectors 52–54 of the various spectral bands 18–21, respectively. "Corresponding" detectors refers to detectors of different spectral bands that would trace the same geodetic latitude in the absence of image rotation. For example, a set of "corresponding" detectors are the detectors 52–54. The coregistration error between the corresponding detectors of two different spectral bands, spatially separated in the MBFPA by the distance, D, is given by the following expression:

$$\text{Error} = \frac{D}{\Delta}\sin\theta \times 100\% \qquad (EQ. 6)$$

where $\Delta$ is the dimension of the square detector. In EQ. 6, the coregistration error is normalized by $\Delta$. Referring still to FIG. 5, the largest coregistration error occurs between the spectral bands that are the farthest apart in the MBFPA (i.e., bands 18 and 21). In this case, D=W-$\Delta$, where W is equal to the width of the MBFPA. As an example, if $\Delta$=45 $\mu$m and W=14.7 mm, then the coregistration error between bands 18 and 21 is approximately 2300% at an elevation of E=4° (a point at a geodetic latitude of approximately 23.6°). This coregistration error grossly exceeds the error limits of a weather imaging system of acceptable image quality and indicates the need for the present invention. We shall now describe how the present invention eliminates the band-to-band coregistration error.

Figure 6:
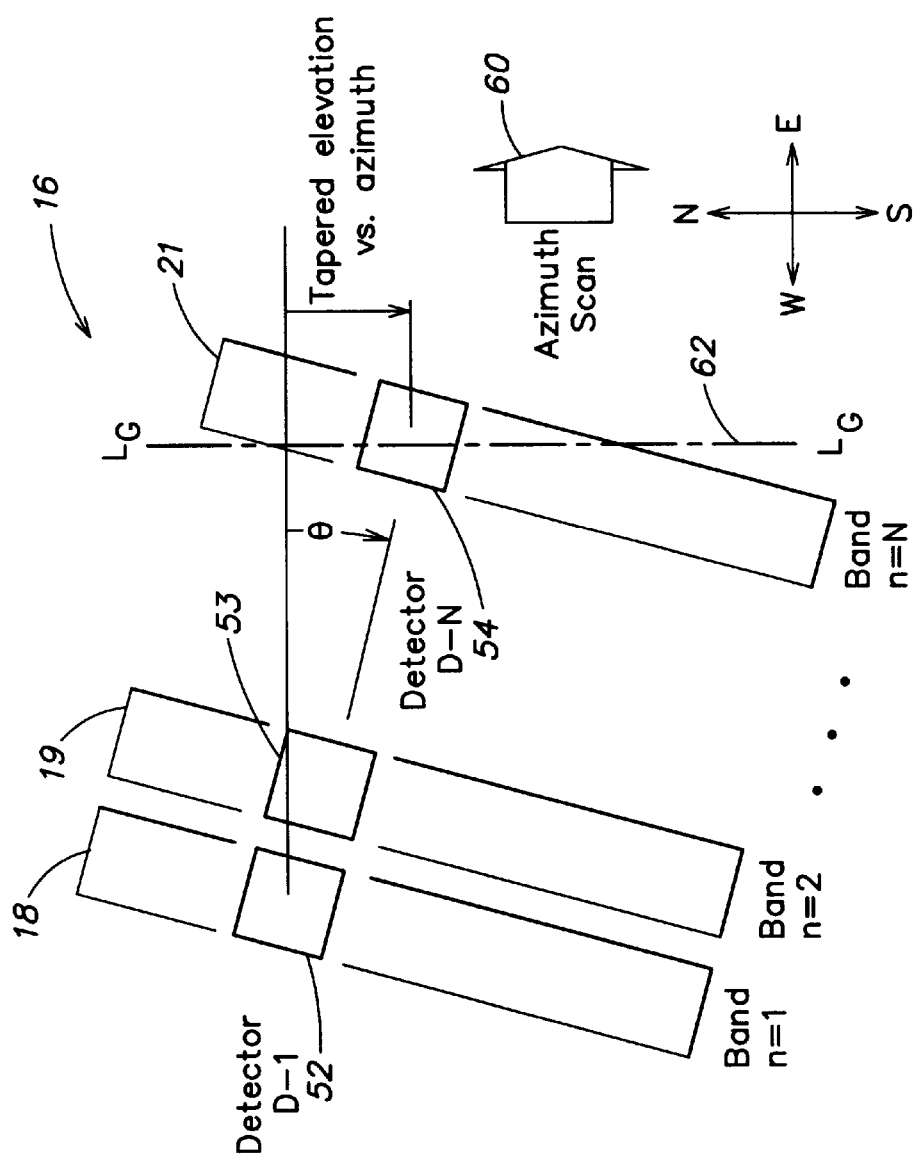
FIG. 6 is an illustration of how scanning the mirror (FIG. 1) in azimuth across the Earth disk while holding the elevation of the mirror constant, causes the detectors of the various bands of the MBFPA to pass through a given geodetic longitude $L_G$.

Referring to FIG. 6, scanning the mirror 14 (FIG. 1) in azimuth 60 across the Earth disk while holding the elevation of the mirror constant, causes the detectors of the various bands 18–21 of the MBFPA to pass through a given geodetic longitude $L_G$ 62 at a different geodetic latitude. For example, during the azimuth scan the detector 52 D–1 passes through $L_G$ 62 at a slightly higher geodetic latitude than when the detector 54 D-N passed through $L_G$ 62 and, in fact, this effect is the source of the band-to-band coregistration error. The consequence of the error is that the corresponding detectors of various spectral bands do not traverse the same point ("spot") in an Earth scene during the scan. According to the present invention, during each scan the elevation of the scanning mirror 14 (FIG. 1) is also controlled as a function of the scan position in elevation and azimuth, such that when the detector 52 D–1 reaches $L_G$ 62, it is at the same geodetic latitude at which the detector 54 D-N passed through $L_G$. Tapering the elevation of the scan versus position of the scan mirror in this way removes the coregistration error by ensuring that the detectors of each spectral band in the MBFPA sample their data at identical geodetic sample points in the Earth scene. Accordingly, the scan process of this invention removes the effect of image rotation and brings the various spectral bands of the MBFPA into coregistration. We shall now quantitatively discuss the present invention.

Since dE/dA=tan $\theta$, the required elevation taper as a function of scan position (the azimuth A and elevation $E_W$) is given by:

$$E = E_W + \int_{A_W}^{A} \tan\theta \, dA \qquad (EQ. 7)$$

where $E_W$ and $A_W$ are the discrete elevation and azimuth settings, respectively, at the beginning of the scan. From EQ. 4 we see that the integrand in EQ. 7 can be expressed as:

$$\tan\theta = \sin E \tan\left(A - \frac{\pi}{4}\right). \quad \text{(EQ. 8)}$$

Substitution of (EQ. 8) into (EQ. 7) yields:

$$E = E_W + \sin E \int_{A_W}^{A} \tan\left(A - \frac{\pi}{4}\right) dA. \quad \text{(EQ. 9)}$$

Evaluating the integral in EQ. 9 we obtain:

$$E = E_W - \sin E \ln\left[\frac{\cos\left(A - \frac{\pi}{4}\right)}{\cos\left(A_W - \frac{\pi}{4}\right)}\right] \quad \text{(EQ. 10)}$$

We see that the right most term of EQ. 10 is the mirror elevation taper versus azimuth that is required to prevent/reduce coregistration errors. We can solve EQ. 10 for E by either numerical iteration or a technique using a Taylor series expansion of sin E. The latter technique works best if we first rearrange EQ. 10 to exploit the rapid convergence of a Taylor series if cast in terms of a variable whose magnitude is small. Accordingly, we introduce the variable $x = E - E_W$ and rewrite EQ. 10 as:

$$x = \sin(x + E_W) f_A \quad \text{(EQ. 11)}$$

where for convenience we define $$f_A = -\ln\left[\frac{\cos\left(A - \frac{\pi}{4}\right)}{\cos\left(A_W - \frac{\pi}{4}\right)}\right].$$

We can use a trigonometric identity to rewrite EQ. 11 as:

$$x = (\cos E_W \sin x + \sin E_W \cos x) f_A \quad \text{(EQ. 12)}$$

Expanding the terms of EQ. 12 involving x as a Taylor series yields:

$$x = [\cos E_W(x - x^3/3! + \ldots) + \sin E_W(1 - x^2/2! + \ldots)] f_A \quad \text{(EQ. 13)}$$

The convergence is rapid because $|x| \ll 1$. Accordingly, we omit terms in x higher than second order to obtain the quadratic equation:

$$x^2 + bx + c = 0 \quad \text{(EQ. 14)}$$

$$\text{where } b = 2\frac{1 - f_A \cos E_W}{f_A \sin E_W} \quad \text{(EQ. 15a)}$$

$$c = -2 \quad \text{(EQ. 15b)}$$

From the definition of x we obtain:

$$E = E_W + x_p \quad \text{(EQ. 16)}$$

where $x_p$, the elevation taper, is given by the appropriate root of EQ. 14. It should be noted that we have also solved EQ. 13 by keeping the third-order terms in x and found negligible change in the results. Alternative solutions based on numerical iteration can be used to solve EQ. 10 for E to arbitrary accuracy.

Figure 7:
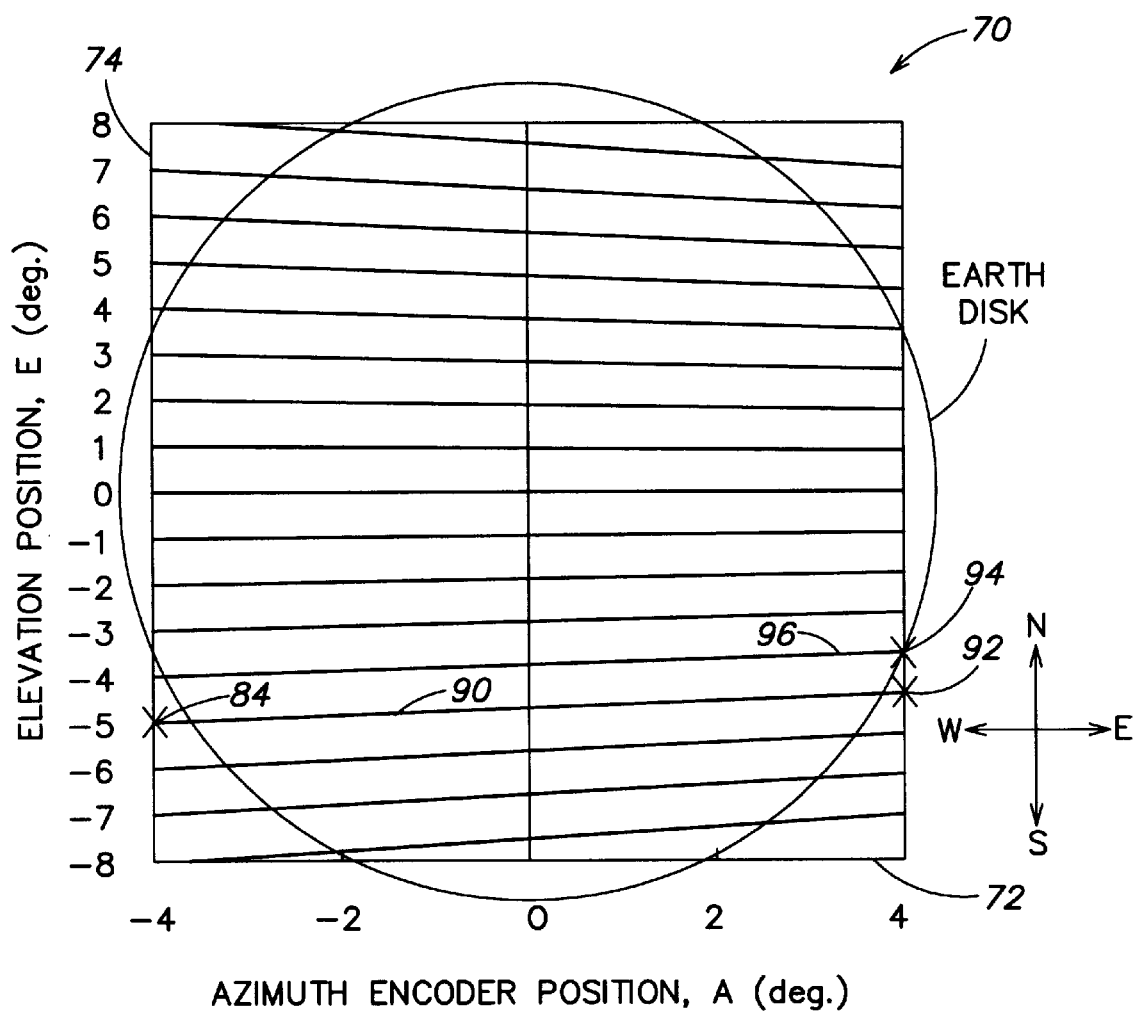
FIG. 7 is a plot of the mirror elevation position versus azimuth position illustrating the taper in elevation as a function of azimuth.

FIG. 7 is a plot 70 of mirror elevation position versus azimuth encoder position based upon EQ. 16, illustrating the taper in elevation as a function of azimuth. Azimuth encoder angle A is plotted along a horizontal axis 72 and elevation angle E is plotted along a vertical axis 74. We shall now briefly describe the operational control of the mirror 14 (FIG. 1).

Figure 8:
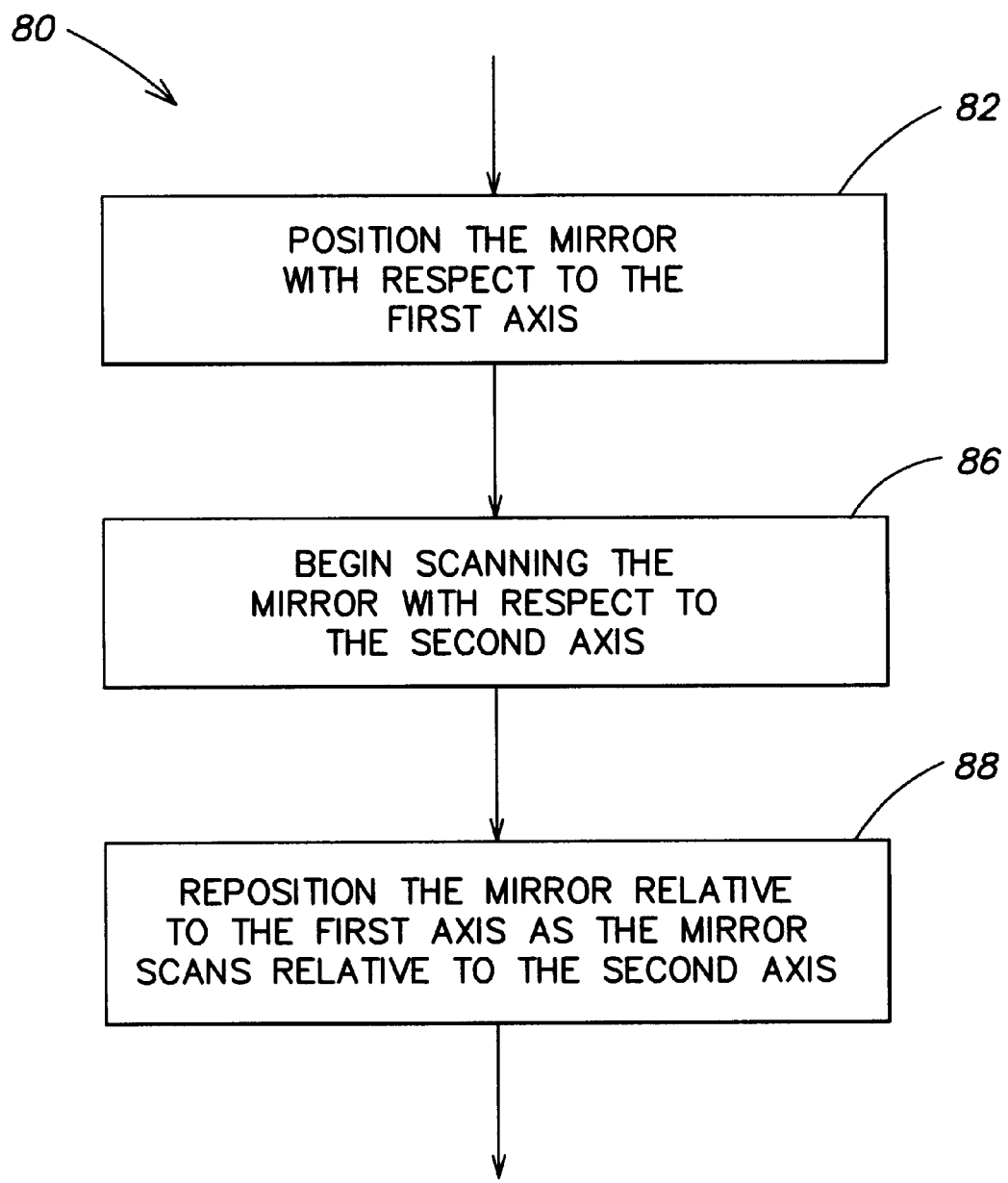
FIG. 8 illustrates a flow chart illustration of a mirror control routine.

FIG. 8 is a flow chart illustration of a mirror control routine 80. The routine 80 can be performed as a series of programmable software steps executed by the control logic of the scan controller 24 (FIG. 1). Referring to FIGS. 1, 7 and 8, a first step 82 in the routine 80 is to position the mirror 14 (e.g., in a discrete step which depends on the swath width of the line arrays in the MBFPA) with respect to the first axis 22 (FIG. 1). This position is based upon the location in elevation of the desired Earth scene to be imaged in the scanning process. The scan controller 24 determines the elevation angle at which the mirror 14 must be placed relative to the first axis 22 to image the desired Earth scene, and provides a command signal on the line 25 to position the mirror accordingly. As an example, this initial elevation position is shown in FIG. 7 as starting point 84. Once the mirror 14 is in the desired elevation position relative to the first axis 22, step 86 is then executed to scan the mirror about the second axis 23 in azimuth. According to the present invention, step 88 is then executed to adjust the position of the mirror in a prescribed way relative to the first axis 22 as the mirror continues to scan about the second axis 23. That is, referring to FIG. 7, as the mirror begins to scan in azimuth from the starting point 84, the scan controller 24 (FIG. 1) commands the mirror to follow line 90. Significantly, as the mirror scans in azimuth, the scan controller also commands the elevation actuator 28 so the mirror position tracks the prescribed elevation "taper" along line 90. At the end of the azimuth scan, the mirror will be at end position 92. The scan controller then commands the mirror to position 94 and begins scanning from right-to-left along line 96. Controlling the mirror position with respect to the first axis 22 as the mirror rotatably scans about the second axis 23 ideally eliminates both the registration and coregistration errors. This is an example of the scan process. The actual size of the scan steps in elevation (one degree in this example) will depend on the length of the line arrays of the MBFPA used in the instrument.

The elevation taper of the present invention causes the swaths of successive scans to overlap in coverage slightly, which varies gradually in amount over the course of the azimuth scan. Simple data editing to remove or average out redundant pixels in the overlapped regions corrects this effect. Editing options include disregarding the "old" pixels of the previous scan in favor of the "new" pixels of the present scan (or vice versa), or averaging or weighting the "new" and "old" overlapped pixels. Although the present invention has been primarily discussed in the context of initially setting the position of the mirror with respect to elevation, and then scanning in azimuth while elevation is changed as a function of scan position, one of ordinary skill in the art will recognize that the roles of the two axes can be reversed. For example, the scan may occur in elevation and the azimuth position is controlled as a function of scan mirror's position.

Although the present invention has been shown and described with respect to several preferred embodiments thereof, various changes, omissions and additions to the form and detail thereof, may be made therein, without departing from the spirit and scope of the invention.

What is claimed is:

1. A method of scanning a mirror that provides an image of a portion of the Earth to a multiband focal plane array of optical detectors in an imager, the method comprising the steps:

positioning the mirror relative to a first axis;

scanning the mirror about a second axis; and repositioning the mirror relative to the first axis while scanning the mirror about the second axis.

2. The method of claim 1, further comprising the step of:

selecting a desired location on the Earth to be imaged by the multiband focal plane array of optical detectors and providing a first axis control signal indicative of the position for the mirror relative to the first axis in order to image the desired location on the Earth.

3. The method of claim 1, wherein the first and second axes are perpendicular to a reflective plane of the mirror that provides the image to the multiband focal plane array of optical detectors in an imager.

4. The method of claim 2, wherein when the mirror is positioned about the first axis to set the scan elevation and the mirror scans in azimuth as it moves about the second axis.

5. The method of claim 2, wherein when the mirror is positioned about the first axis to set the scan azimuth and the mirror scans in elevation as it moves about the second axis.

6. A method of controlling the position of a planar mirror in an orbital weather imaging system to provide a reflected image to a multiband focal plane array of optical detectors in an imager, the method comprising the steps of:

positioning the mirror relative to a first axis;

positioning the mirror relative to a second axis; and scanning the mirror relative to the first axis while repositioning the mirror relative to the second axis as a function of the mirror position relative to the first axis, to reduce registration and coregistration errors provided by the multiband focal plane array of optical detectors.

7. An orbital weather imaging system that images a selected portion of the Earth onto a multi-spectral-band array of optical detectors on a focal plane that is displaced in angle from the plane of the scene, while compensating for the rotation of the scene's image on the focal plane with respect to the actual scene to maintain the registration of pixel location in each image frame, and maintain the coregistration among the spectral bands in the focal plane array during the scan of the selected portion of the Earth, the system comprising:

a focal plane array having a plurality of imaging bands;

a mirror mounted to scan in elevation and in azimuth and provide a reflective image of the Earth scene onto said focal plane array; and a controller that commands said mirror to a starting elevation position and to a starting azimuth position, and then scans said mirror in elevation while also scanning said mirror in azimuth.

8. The orbital weather imaging system of claim 7, wherein said controller comprises:

a mirror azimuth position sensor that provides an azimuth position signal;

a mirror elevation position sensor that provides an elevation position signal;

an electronic controller responsive to said azimuth position signal, said elevation position signal and a signal indicative of the area to be imaged, to compute an azimuth command signal and an elevation command signal;

a first actuator responsive to said azimuth command signal to position said mirror in azimuth; and a second actuator responsive to said elevation command signal to position said mirror in elevation.

9. The orbital weather imaging system of claim 8, wherein said focal plane array includes a visible imaging band and a plurality of infrared imaging bands.

* * * * *

(12) EX PARTE REEXAMINATION CERTIFICATE (6577th)
United States Patent
Carlisle

(10) Number: US 6,201,232 C1
(45) Certificate Issued: Dec. 23, 2008

(54) IMAGING SYSTEM WITH A TWO-AXIS-GIMBAL MIRROR SCAN SYSTEM APPARATUS AND METHOD

(75) Inventor: Guy W. Carlisle, Bedford, MA (US)

(73) Assignee: The United States of America as represented by the Secretary of the Air Force, Washington, DC (US)

Reexamination Request:
No. 90/007,981, Mar. 23, 2006

Reexamination Certificate for:
Patent No.: 6,201,232
Issued: Mar. 13, 2001
Appl. No.: 09/198,698
Filed: Nov. 24, 1998

(51) Int. Cl.
*G01C 11/02* (2006.01)
*G01C 11/00* (2006.01)
*G02B 26/10* (2006.01)

(52) U.S. Cl. .................. 250/206.2; 250/236; 359/212
(58) Field of Classification Search .................. 359/201, 359/214; 250/206.1, 206.2, 236
See application file for complete search history.

(56) References Cited

U.S. PATENT DOCUMENTS 4,688,091 A * 8/1987 Kamel et al. ................. 348/147
4,688,092 A * 8/1987 Kamel et al. ................. 348/147
5,654,549 A * 8/1997 Landecker et al. ........... 250/332

OTHER PUBLICATIONS

Salomonson et al., "Modis: Advanced Facility Instrument for Studies of the Earth as a System" IEEE Transactions on Geoscience and Remote Sensing, vol. 27 No. 2, Mar. 1989.

* cited by examiner

*Primary Examiner*—Anjan K. Deb

(57) ABSTRACT

A mirror is scanned to provide an image of a portion of the Earth to a multiband focal plane array (MBFPA) of optical detectors (an "imager"). Initially, the mirror is positioned relative to a first axis. The mirror is then scanned about a second axis and repositioned relative to the first axis while scanning the mirror about the second axis. This invention may be used in a weather satellite to remove prevent/reduce errors in pixel-to-pixel registration within an image frame and errors in band-to-band that occur when the various imaging bands (e.g., visual and infrared) of the MBFPA are used to image or scan selected areas of the Earth. The present invention positions the mirror relative to the first axis (e.g., elevation), and while scanning the mirror about the second axis (e.g., azimuth), the mirror is regularly repositioned in a prescribed manner relative to the first axis. That is, the invention dynamically adjusts the position of the mirror relative to the first axis while scanning about the second axis. Scanning about the first axis may be an elevation scan while scanning about the second axis may be an azimuth scan, or vis-a-versa. Advantageously, this control technique ensures that the images within each spectral band are spatially registered pixel-by-pixel within the image frame, and that the images of the various spectral bands are spatially coregistered with respect to each other. The present invention provides a scan-control techinque for a single-mirror scan system that enables the use of the MBFPA in an imaging instrument.

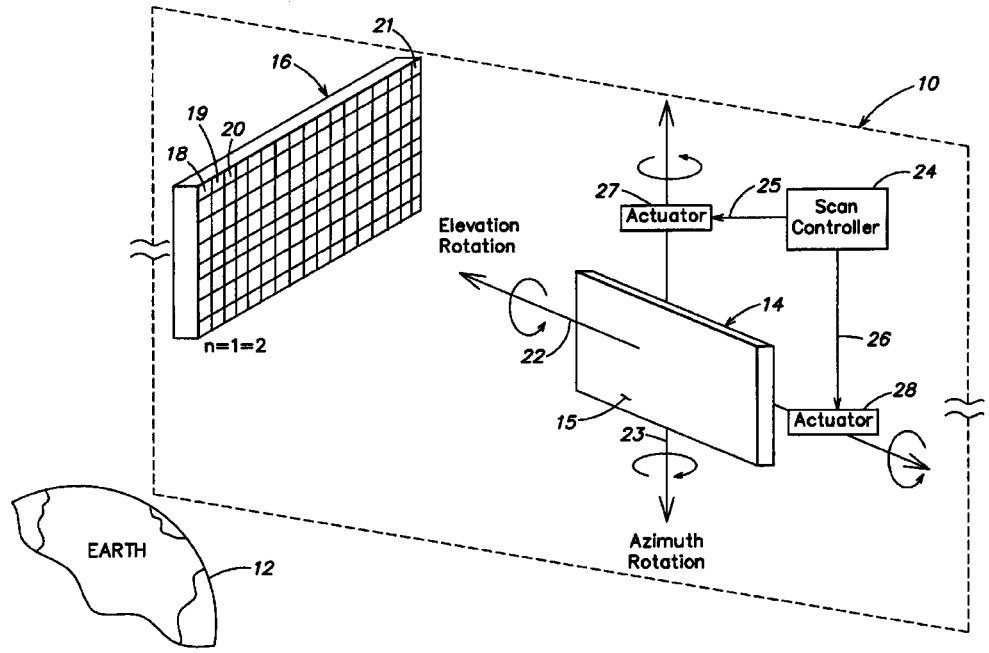

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1,6 and 7 are determined to be patentable as amended.

Claims 2–5, 8 and 9 dependent on an amended claim, are determined to be patentable.

1. A method of scanning a *geostationary orbiting* mirror that [provides] *is subject to a scanning distortion known as image rotation, the geostationary orbiting mirror providing* an image of a portion of the Earth to a multiband focal plane *optical-detector-*array [of optical detectors] in an imager, the method comprising [the steps]:

positioning the *geostationary orbiting* mirror relative to a first axis;

scanning the *geostationary orbiting* mirror about a second axis; and

*substantially preventing geometrical registration errors due to the scanning distortion known as image rotation by dynamically* repositioning the *geostationary orbiting* mirror relative to the first axis while *simultaneously* scanning the *geostationary orbiting* mirror about the second axis.

6. A method of controlling the position of a planar *geostationary orbiting* mirror in [an orbital] *a geostationary orbiting* weather imaging system to provide a reflected image to a multiband focal plane *optical-detector-*array [of optical detectors] in an imager, *the geostationary orbiting mirror being subject to a scanning distortion known as image rotation,* the method comprising [the steps of]:

positioning the *geostationary orbiting* mirror relative to a first axis;

positioning the *geostationary orbiting* mirror relative to a second axis; [and]

scanning the *geostationary orbiting* mirror relative to the first axis [while]*; and*

*reducing registration errors from image rotation, during the scanning of the geostationary orbiting mirror relative to the first axis, by dynamically* repositioning the *geostationary orbiting* mirror relative to the second axis as *a simultaneous* function of the mirror position relative to the first axis[, to reduce registration and coregistration errors provided by the multiband focal plane array of optical detectors].

7. [An orbital] *A geostationary orbiting* weather imaging system that images a selected portion of the Earth onto a multi-spectral-band *optical-detector-*array [of optical detectors on a focal plane] that is displaced in angle from the plane of the scene, while compensating for the rotation of the scene's image on the focal plane with respect to the actual scene to maintain the registration of pixel location in each image frame, and maintain the coregistration among the spectral bands in the focal plane array during the scan of the selected portion of the Earth, the system comprising:

a *geostationary orbiting* focal plane array having a plurality of imaging bands;

a *geostationary orbiting* mirror mounted to scan in *north-south* elevation and in *east-west* azimuth and provide a reflective image of the Earth scene onto said *geostationary orbiting* focal plane array; and a controller that commands said *geostationary orbiting* mirror to a starting *north-south* elevation position and to a starting *east-west* azimuth position[, and then scans said mirror in elevation while also scanning said mirror in azimuth]*;*

*said controller controlling the positioning of said geostationary orbiting mirror to substantially prevent geometrical registration errors from image rotation by dynamically repositioning the geostationary orbiting mirror in north-south elevation while simultaneously scanning the geostationary orbiting mirror in east-west azimuth.*

\* \* \* \* \*